United States Patent
Fukawatase (10) Patent No.: US 8,899,619 B2
(45) Date of Patent: Dec. 2, 2014

(54) VEHICLE SEAT

(71) Applicant: Osamu Fukawatase, Miyoshi (JP)

(72) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/935,785

(22) Filed: Jul. 5, 2013

(65) Prior Publication Data

US 2014/0015233 A1 Jan. 16, 2014

(30) Foreign Application Priority Data

Jul. 10, 2012 (JP) ................................. 2012-154911

(51) Int. Cl.
*B60R 21/207* (2006.01)
*B60R 21/08* (2006.01)
*B60R 21/16* (2006.01)

(52) U.S. Cl.
CPC ............... *B60R 21/207* (2013.01); *B60R 21/08* (2013.01); *B60R 2021/2074* (2013.01); *B60R 2021/161* (2013.01)
USPC ........................................ 280/749; 280/730.2

(58) Field of Classification Search
CPC .................. B60R 21/207; B60R 21/08; B60R 2021/2074; B60R 2021/022
USPC ................................................ 280/749, 730.2
See application file for complete search history.

(56) References Cited

U.S. PATENT DOCUMENTS

| 5,636,862 | A  | * | 6/1997  | Cheung et al. ............. 280/730.2 |
| 5,806,923 | A  |   | 9/1998  | Tschäschke et al. |
| 6,029,993 | A  | * | 2/2000  | Mueller ...................... 280/730.2 |
| 7,021,654 | B2 | * | 4/2006  | Honda et al. ............... 280/730.2 |
| 7,048,300 | B2 | * | 5/2006  | Honda et al. ............... 280/730.2 |
| 7,240,915 | B2 | * | 7/2007  | Peng et al. .................. 280/730.2 |
| 7,658,401 | B2 | * | 2/2010  | Valdez et al. ............... 280/730.2 |
| 7,896,388 | B2 | * | 3/2011  | Sugimoto et al. .......... 280/730.2 |
| 8,690,187 | B2 | * | 4/2014  | Fukawatase ................ 280/730.2 |
| 2006/0119083 | A1 | * | 6/2006 | Peng et al. .................. 280/730.2 |
| 2006/0289220 | A1 |   | 12/2006 | Oota et al. |
| 2012/0126518 | A1 |   | 5/2012  | Fukawatase |
| 2013/0093224 | A1 | * | 4/2013  | Dainese et al. ........... 297/216.12 |
| 2014/0042733 | A1 | * | 2/2014  | Fukawatase ................ 280/730.2 |

FOREIGN PATENT DOCUMENTS

| JP | A-10-71883      | 3/1998 |
| JP | A-2003-220921   | 8/2003 |
| JP | A-2007-8194     | 1/2007 |
| JP | A-2009-29182    | 2/2009 |
| WO | WO 2011/016107 A1 | 2/2011 |
| WO | WO 2013/099888 A1 | 7/2013 |

* cited by examiner

*Primary Examiner* — Nicole Verley
(74) *Attorney, Agent, or Firm* — Oliff PLC (57) ABSTRACT

A vehicle seat includes a projected member that is accommodated in a seat back, and that is projected and deployed above the seat back when inflated by a gas supply; a lateral deployment member whose upper end side is connected to the projected member, whose lower end side is connected to a front end side of a seat cushion, and that is accommodated in a lateral side of the seat cushion and a lateral side of the seat back; and a tension support member whose one end side is supported by the seat back in a portion separated from the lateral deployment member in a seat width direction and whose other end side is connected to an upper end side of the lateral deployment member or the projected member.

13 Claims, 9 Drawing Sheets

FIG. 9

VEHICLE SEAT

INCORPORATION BY REFERENCE

The disclosure of Japanese Patent Application No. 2012-154911 filed on Jul. 10, 2012 including the specification, drawings and abstract is incorporated herein by reference in its entirety.

BACKGROUND OF THE INVENTION

1. Field of the Invention

The present invention relates to a vehicle seat.

2. Description of Related Art

A technology has been known in which a belt is stretched from a shoulder portion of a seat back to a front end of a seat cushion to restrict movement of a seated passenger to a side of a vehicle when a side collision is predicted (see Japanese Patent Application Publication No. 2007-008194 (JP 2007-008194 A), for example). Another technology has been known in which a belt is stretched from an upper end of the seat back to the front end of the seat cushion to restrict movement of a side airbag to the outside in a vehicle width direction when a side collusion occurs (see Japanese Patent Application Publication No. 2009-029182 (JP 2009-029182 A), for example). Furthermore, an impact protection system has been known in which a trapping net is deployed on a side of the passenger by a tightening belt that is tightly stretched between the upper end of the seat back and the front end of the seat cushion during a collision (see Japanese Patent Application Publication No. H10-071883 (JP H10-071883 A), far example). This trapping net is stretched in a triangular plane when seen from a side of a vehicle that is bordered by the seat back and the seat cushion.

In each of the above, a topmost supported position of the belt or the trapping net is limited to the upper end of the seat back. Thus, there is room for improvement in passenger restraint performance by the belt, the trapping net, or an airbag supported thereby.

SUMMARY OF THE INVENTION

The present invention provides a vehicle seat in which passenger restraint performance can be improved by a lateral deployment member or an airbag that is supported by the lateral deployment member.

The vehicle seat according to a first aspect of the present invention includes: a projected member that is accommodated in a seat back, and that is projected and deployed above the seat back when inflated by a gas supply; a lateral deployment member whose upper end side is connected to the projected member, whose lower end side is connected to a front end side of a seat cushion, and that is accommodated in a side portion of the seat cushion and a side portion of the seat back; and a tension support member whose one end side is supported by the seat back in a portion separated from the lateral deployment member in a seat width direction and whose other end side is connected to an upper end side of the lateral deployment member or the projected member. The lateral deployment member is deployed by tension that is exerted when the projected member is projected and deployed above the seat back and that acts between a portion of the lateral deployment member connected to the projected member and a portion of the lateral deployment member connected to the seat cushion. The tension support member is subject to the tension in the seat width direction at least when a seated passenger is restrained by the lateral deployment member.

In the vehicle seat according to the first aspect, the gas is supplied to the projected member when a side collision of a vehicle is detected or predicted, for example. Thereafter, the projected member is projected and deployed above the seat back, and in conjunction with this deployment, the lateral deployment member is also deployed. The thus-deployed lateral deployment member directly or indirectly restricts movement of the seated passenger to a side.

At this time, because the projected member lifts an upper end of the lateral deployment member above an upper end of the seat back, a tension line of the lateral deployment member is positioned forward with respect to a tension line in a configuration in which a position of the upper end of the lateral deployment member is limited to the upper end of the seat back. Accordingly, it is possible to restrain a shoulder of the passenger by the lateral deployment member. Furthermore, in this vehicle seat, the tension support member connects between the upper end side of the deployed lateral deployment member and the seat back. Thus, it is possible to effectively support a restraint load of the passenger by the tension support member in a configuration having the projected member that is inflated and deployed by gas pressure and is projected on the seat back. Therefore, in this vehicle seat, the tension line of the lateral deployment member is positioned forward with respect to the above comparative configuration, and thus it is possible to effectively restrict the movement of the passenger to the side by the lateral deployment member. In other words, the passenger restraint performance that is demonstrated by the lateral deployment member can be improved.

In the above aspect, the projected member may be disposed for deployment along a side portion of a headrest provided on the seat back that is on an accommodated side of the lateral deployment member, and the one end side of the tension support member may extend around on another side portion of the headrest that is opposite from the side portion on a disposed side of the projected member.

According to the above aspect, the projected member is stably projected while being guided by a side surface of the headrest. An end portion of the tension support member on an opposite side from the lateral deployment member extends around on the side of the headrest. Therefore, the restraint load (a reaction force) acting on the lateral deployment member for restraining the seated passenger is supported by the tension support member being hooked to the headrest as well as by the tension of the tension support member.

In the above aspect, in an upper surface of the seat back, the vehicle seat may further include: a first tear line that is formed along the seat width direction on the disposed side of the projected member with respect to the headrest and that is formed for projecting the projected member; and a second tear line that passes behind the headrest and is connected to the first tear line, whose one end portion on an opposite side from the first tear line extends along the other side portion of the headrest in a front-rear direction of the seat in a plan view in which the vehicle seat is seen from above, and that is formed for projecting the tension support member.

In the above aspect, because the tear line is formed on the seat back by following a deployed shape of the tension support member, the tension support member can be deployed together with the lateral deployment member in a short time. In other words, the tension support member and the lateral deployment member can appropriately be deployed before the restraint load of the seated passenger acts thereon or before the load acting thereon increases.

In the above aspect, the projected member may have a folded shape in which paired struts aligned in parallel are coupled to each other at upper ends, and may be projected and deployed above the seat back when the gas is supplied to one of the struts.

In the vehicle seat according to the above aspect, the gas is supplied to one of the struts in the projected member that has a substantially inverted U shape in a front view. Therefore, the projected member is likely to be deployed upright. Particularly, in a configuration that the projected member in a process of the deployment is guided by the side surface of the headrest, the projected member is deployed further stably.

In the above aspect, the vehicle seat may further include a side airbag that is accommodated in the seat back and that is inflated and deployed between the lateral deployment member and the seated passenger when a side collision of the vehicle is detected or predicted.

In the vehicle seat according to the above aspect, the side airbag is inflated and deployed between the lateral deployment member and the seated passenger when a side collision of the vehicle is detected or predicted, for example. Accordingly, the side airbag is deployed while a displacement thereof in a vehicle width direction is restricted by the lateral deployment member. In addition, because the side airbag is inflated and deployed along the lateral deployment member, a direction of the deployment thereof during an initial period of the deployment is stabilized. This vehicle seat includes the tension support member and the lateral deployment member that are configured as described above. Therefore, it is possible to improve the passenger restraint performance that is demonstrated by the side airbag.

The vehicle seat according to the above aspect has a superior effect of improving the passenger restraint performance by the lateral deployment member or an airbag that is supported by the lateral deployment member

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A, 3B, and 3C partially show a process of deployment of a tension cloth that constitutes the vehicle seat according to the first embodiment in which

FIGS. 4A, 48, and 4C partially show the process of deployment of the tension cloth that constitutes the vehicle seat according to the first embodiment in which

DETAILED DESCRIPTION OF EMBODIMENTS

[First Embodiment]

A vehicle seat 10 according to a first embodiment of the present invention will herein be described with reference to FIG. 1 to FIG. 4. An arrow FR, an arrow UP, and an arrow IN appropriately shown in each of the drawings respectively indicate a front direction, an upper direction, and inside in a vehicle width direction of a vehicle in which the vehicle seat 10 is mounted. Unless otherwise noted, a front-rear direction and an upper and down direction in the following description respectively refer to a front-rear direction of the vehicle and an upper and down direction of the vehicle. In addition, unless otherwise noted, a front view is a view of a vehicle seat seen from the front, a plane view is a view of the vehicle seat seen from the above, and a side view is a view of the vehicle seat seen from the side. Unless otherwise noted, on an outside in the vehicle width direction refers to a side which is closer to the outer portion of the vehicle in the width direction than to an inner portion of the vehicle in the width direction, and also refers to a side on a door side. On an inside in the vehicle width direction refers to an opposite side to the outside in the vehicle width direction, and also refers to a side on an adjacent seat side.

Figure 1:
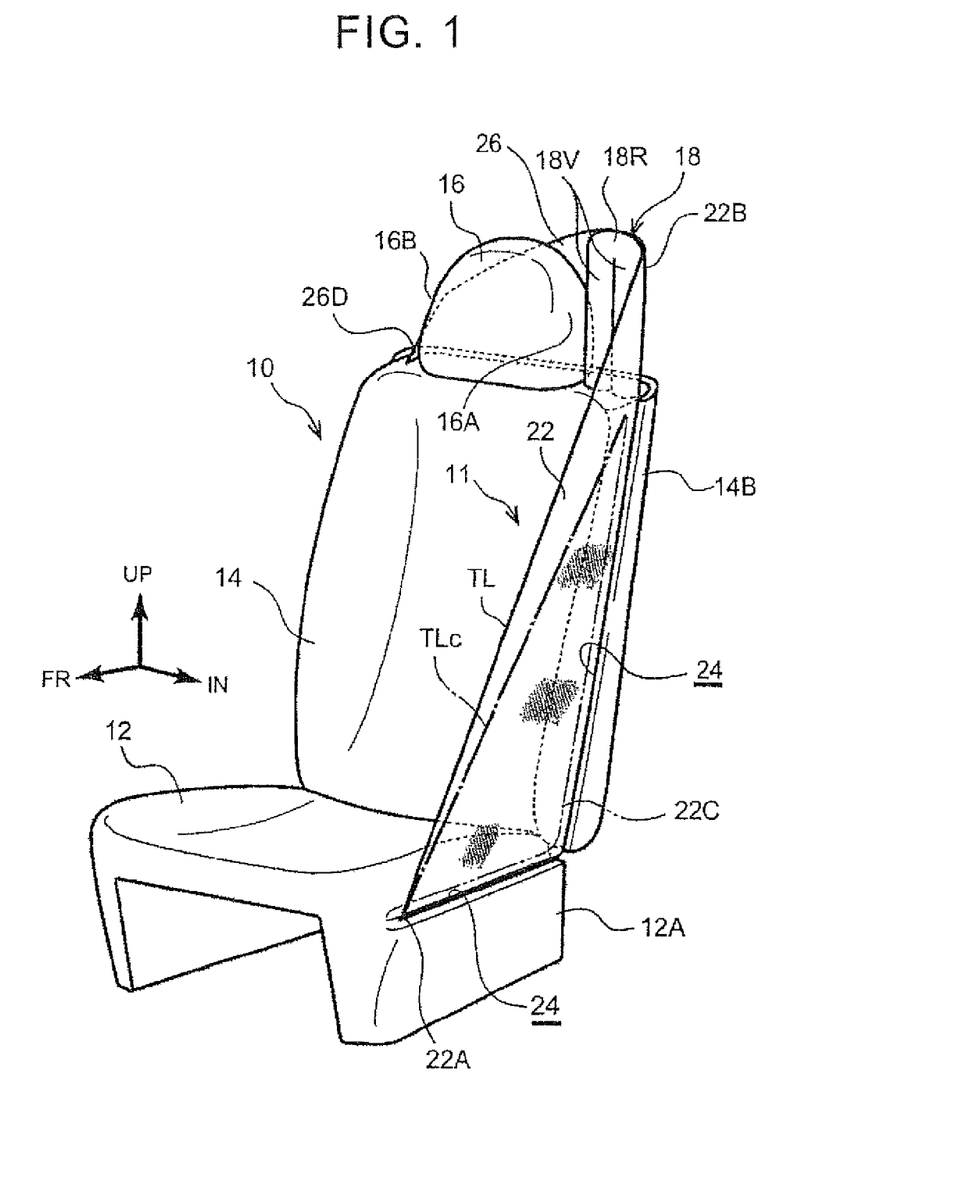
FIG. 1 is a perspective view for showing an operational state of a passenger restraining system in a vehicle seat according to a first embodiment of the present invention.

FIG. 1 is a perspective view of the vehicle seat 10 to which a passenger restraining system 11, which will be described later, is applied. The vehicle seat 10 is provided such that the seated passenger faces forward. More specifically, the vehicle seat 10 includes, as main components thereof, a seat cushion 12 that forms a seating portion, a seat back 14 that forms a backrest and whose lower end portion is connected to a rear end portion of the seat cushion 12, and a headrest 16 that is provided on an upper end of the seat back 14. Although the vehicle seat 10 in this embodiment is adopted as a driver seat or a passenger seat, it may also be adopted as a seat in a second row or a rear seat row.

(Configuration of a Popup Duct)

Figure 2:
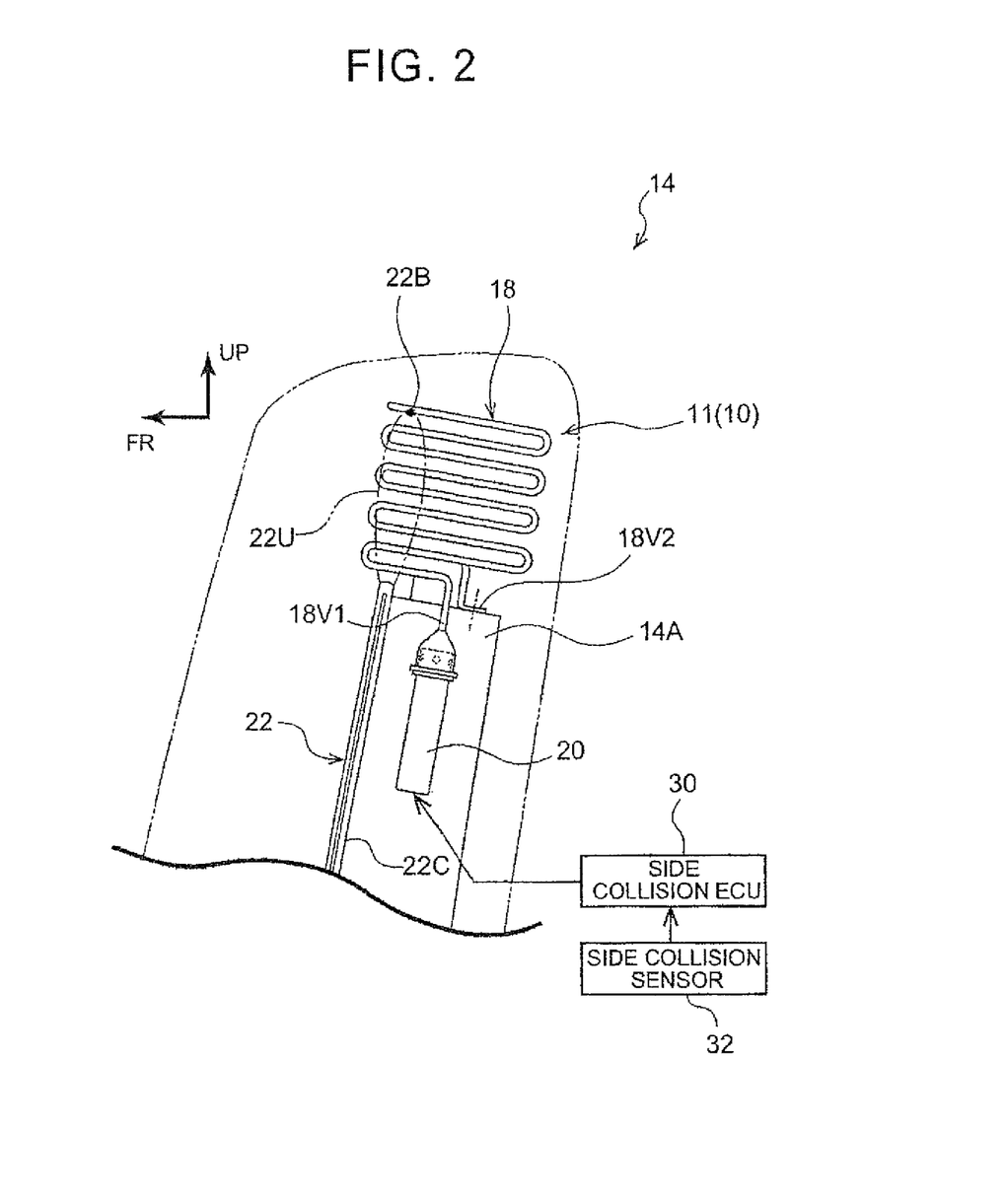
FIG. 2 is an enlarged side view for schematically showing a popup duct in enlargement that is accommodated in a seat back and constitutes the vehicle seat according to the first embodiment.

As shown in FIG. 1, the vehicle seat 10 includes a popup duct 18 as a projected member that constitutes the passenger restraining system 11. The popup duct 18 is accommodated in the seat back 14 in a folded state as shown in FIG. 2 and is deployed on the seat back 14 as shown in FIG. 1 when being inflated with a gas supply. A detailed description thereof will be made below.

The popup duct 18 tears a tear line, which is formed on the upper end of the seat back 14 and will be described later, by inflation pressure (gas pressure) while being inflated with the gas supplied from an inflator 20 and thus is projected onto seat back 14. The popup duct 18 in this embodiment is projected on the seat back 14 on the inside in the vehicle width direction with respect to the headrest 16, that is, on a next seat side.

The deployed popup duct 18 is folded into a substantially inverted U shape. More specifically, the popup duct 18 is configured such that upper ends of vertical ducts 18V as paired struts that are aligned in parallel in a seat width direction are coupled to each other by a folding duct 18R. In this embodiment, the paired vertical ducts 18V are connected to each other so as not to separate from each other in the seat width direction. In other words, the paired vertical ducts 18V are divided in the inside by a cloth divider or a seam (a sewn portion), which is not shown.

The popup duct 18 is supplied with the gas from the inflator 20 that enters the vertical duct 18V on the headrest 16 side (see an arrow G in FIG. 3B and FIG. 3C), and the gas in turn flows though the folding duct 18R and is supplied to the other vertical duct 18V. As schematically shown in FIG. 2, a lower end portion 18V1 of the vertical duct 18V on the headrest 16 side is supported via the inflator 20 by a seat back frame 14A that constitutes the seat back 14. A lower end portion 18V2 of the other vertical duct 18V is directly supported by the seat back frame 14A that constitutes the seat back 14.

Figure 3A:
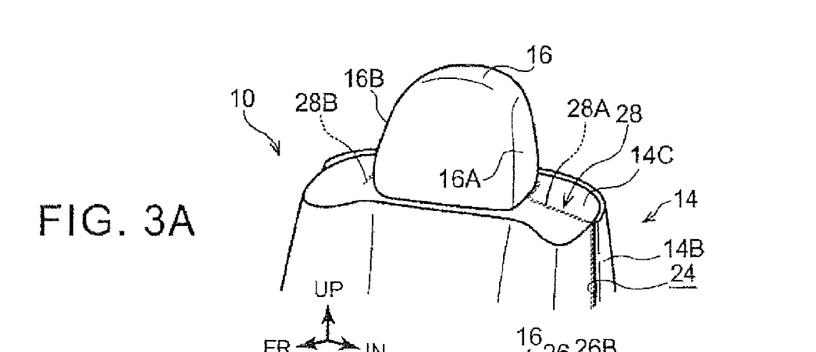
FIG. 3A is a perspective view before an operation.
Figure 3B:
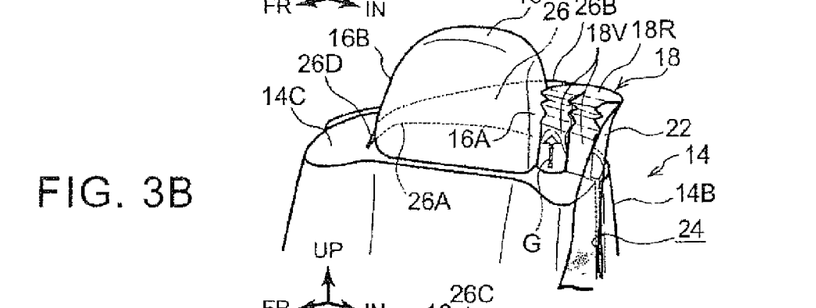
FIG. 3B is a perspective view in a middle of the deployment.
Figure 3C:
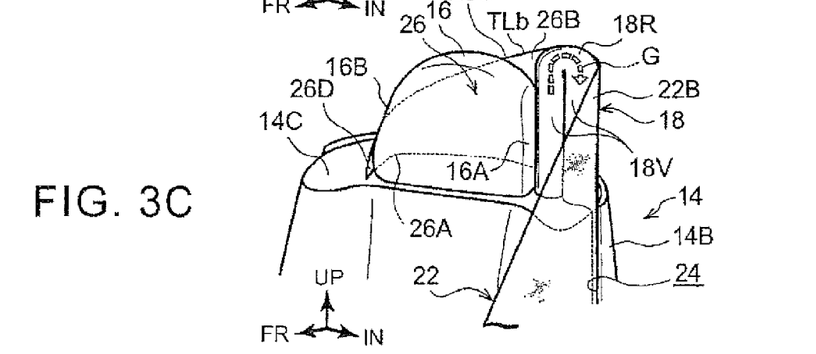
FIG. 3C is a perspective view after completion of the deployment.
Figure 4A:
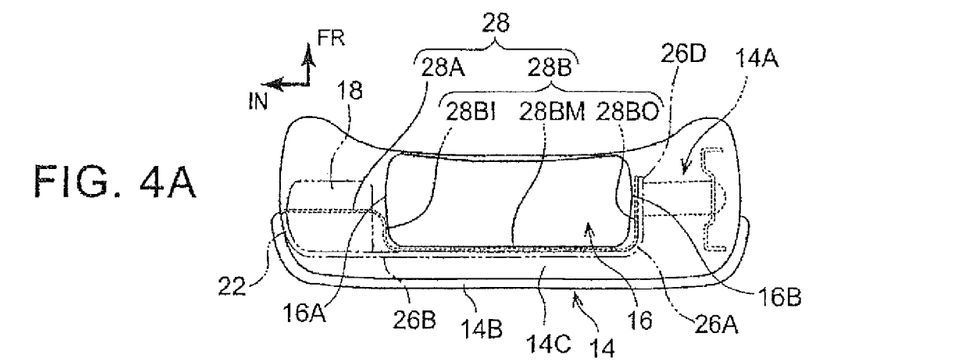
FIG. 4A is a plan view before the operation.
Figure 4B:
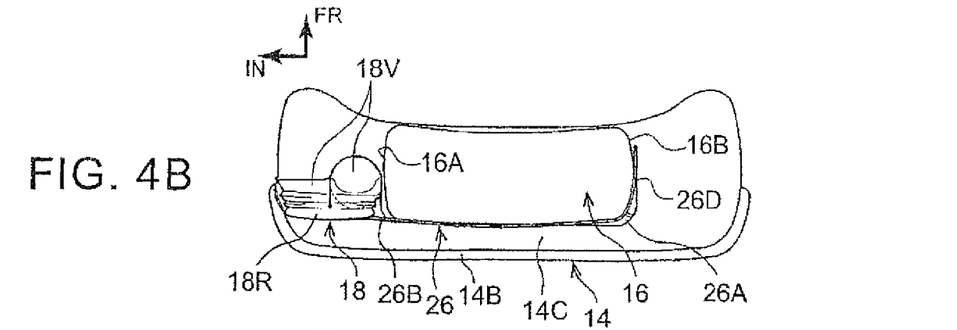
FIG. 4B is a plan view in the middle of the deployment.

Furthermore, as shown in FIG. 3B and FIG. 4B, the popup duct 18 is inflated and deployed along a side surface 16A of the headrest 16 that is on the inside in the vehicle width direction. More specifically, the popup duet 18 is configured such that the vertical duct 18V on the headrest 16 side is guided by the side surface 16A of the headrest for upward inflation and deployment and the other vertical duct 18V is then supplied with the gas to complete the inflation and deployment. As shown in FIG. 1 and FIG. 3C, an upper end of the popup duct 18 that has been inflated and deployed is located near an upper end of the headrest 16 in the upper and down direction.

(Configuration of a Tension Cloth)

As shown in FIG. 1, the passenger restraining system 11 includes a tension cloth 22 that functions as a lateral deployment member that is deployed on a side of the vehicle seat 10 during a side collision, which will be described later. The tension cloth 22 in a deployed state has a substantially triangular shape in the side view. In this embodiment, the tension cloth 22 is provided in a side portion of the vehicle seat 10 on the inside in the vehicle width direction (on the adjacent seat side), but is not provided in a side portion of the vehicle seat 10 on the outside in the vehicle width direction (on the door side). The tension cloth 22 may be provided in each of the right and left side portion of the vehicle seats 10 on the inside in the vehicle width direction.

In the tension cloth 22, a lower end 22A is connected to a seat cushion frame and the like (not shown) at a front end side of the seat cushion 12. Meanwhile, an upper end 22B of the tension cloth 22 is connected to an upper end of a wall of the popup duct 18 on the inside in the vehicle width direction. Moreover, as shown in FIG. 2, a rear edge portion 22C of the tension cloth 22 is connected to the seat back frame 14A.

As shown in an imaginary two-dot chain line in FIG. 1, the tension cloth 22 is folded in a substantially L shape along side portions of the seat cushion 12 and the seat back 14 and accommodated in the side portions of the seat cushion 12 and the seat back 14 before the deployment of the popup duct 18. The side portions of the seat cushion 12 and the seat back 14 are formed with a cut line (slit) 24 so that the tension cloth 22 can be stretched therefrom. In this embodiment, the cut line 24 is formed along a front edge of a backboard 14B on both sides of the seat back 14 and an upper edge of a side cover 12A on both sides of the seat cushion 12. The cut line 24 may be formed along seams of a seat cover material in the side portions of the seat cushion 12 and the seat back 14.

The tension cloth 22 is pulled out of the seat cushion 12 and the seat back 14 through the cut line 24 in conjunction with a transition of the popup duct 18 from an accommodated state in the seat back 14 to the deployed state on the seat back 14. Then, tension acts along a straight line (tension Line TL) that connects between the lower end 22A connected to the seat cushion 12 and the upper end 22B connected to the popup duct 18, and thereby the tension cloth 22 is deployed as shown in FIG. 1.

In order to follow the deployment of the popup duct 18, an upper portion 22U of the tension cloth 22 (see FIG. 2) is appropriately folded in the upper and down direction without being connected to the seat back frame 14A (not shown). In the deployed state, a portion of the tension cloth 22 that is connected to the popup duct 18 reaches near the upper end of the headrest 16. The tension cloth 22 in the above-described deployed state is configured to restrict the movement of the seated passenger to the inside in the vehicle width direction.

(Configuration of a Back Tension Cloth)

As shown in FIG. 1, the passenger restraining system 11 includes a back tension cloth 26 that functions as a tension support member. The back tension cloth 26 in a deployed state extends from the upper end portion of the tension cloth 22 (near a portion connected to the popup duct 18) to the outside in the vehicle width direction, passes behind the headrest 16, and reaches the outside in the vehicle width direction with respect to the headrest 16. The back tension cloth 26 is configured such that, at least when a restraint load of the seated passenger (an inward load in the vehicle width direction) acts on the tension cloth 22, it supports a part of the load as the tension. A detailed description thereof will be made below.

The back tension cloth 26 is folded and accommodated in an upper portion of the seat back 14 as shown in an imaginary two-dot chain line in FIG. 4A, and at least an outer end portion 26A thereof in the vehicle width direction is connected at its lower end side to the seat back frame 14A. An inner end portion 26B of the back tension cloth 26 in the vehicle width direction is continuous with the upper portion 22U of the tension cloth 22. In this embodiment, the back tension cloth 26 is integrally formed with the tension cloth 22.

The back tension cloth 26 in the deployed state has a substantially triangular shape or a trapezoidal shape in a front view in which a projected height thereof from the seat back 14 gradually increases from the outer end portion 26A to the inner end portion 26B in the vehicle width direction. When the above-described restraint load acts on the tension cloth 22, the back tension cloth 26 supports a part of the restraint load as the tension with a proximity of an upper edge 26C being set as a tension line TLb (see FIG. 3C).

The back tension cloth 26 also includes a hooked portion 26D that extends forward from the outer end portion 26A in the vehicle width direction and extends around on the outside of the headrest 16 in the vehicle width direction. The hooked portion 26D is connected at a lower end side thereof to the seat back frame 14A and is deployed to face a side surface 16B of the headrest 16 on the outside in the vehicle width direction (on the door side) in conjunction with the deployment of the back tension cloth 26. Accordingly, the hooked portion 26D of the back tension cloth 26 is hooked to the side surface 16B of the headrest 16 when the above-described restraint load acts on the tension cloth 22.

Therefore, the back tension cloth 26 is configured such that the tension (a reaction force) that acts thereon by receiving the above-described restraint load is not only supported by the seat back frame 14A to which the back tension cloth 26 is connected but is also supported through interference with the headrest 16. In other words, it can also be understood that the hooked portion 26D is configured to increase a width of a portion in the back tension cloth 26 in the upper and down direction that may support the restraint load along the above tension line TLb.

(Configuration of a Tear Line)

As shown in FIG. 3A and FIG. 4A, an upper surface 14C of the seat back 14 is formed with a tear line 28 that is torn when the popup duct 18 (including the portion connected to the tension cloth 22) and the back tension cloth 26 are deployed. The tear line 28 is formed, for example, by thinning the seat cover material that constitutes the upper surface 14C of the seat back 14 from the inside of the seat back 14, and thus can easily be broken when compared to other portions.

The tear line 28 in this embodiment includes a first tear line 28A mainly for projecting the popup duct 18 and a second tear line 28B mainly for projecting the back tension cloth 26. The first tear line 28A is formed as a straight line in the vehicle width (seat width) direction that extends from a central portion of the side surface 16A of the headrest 16 in the front-rear direction to an end of the upper surface 14C of the seat back 14 on the inside in the vehicle width direction in the plan view. The end of the first tear line 28A on the inside in the vehicle width direction is connected to an upper end of the cut line 24 that is formed on the seat back 14.

The second tear line 28B extends from the outer end of the first tear line 28A in the vehicle width direction and passes behind the headrest 16 to form a substantial U shape that opens to the front in the plan view. More specifically, the second tear line 28B has an inner side line 28BI and an outer side line 28BO that respectively extend in the front-rear direction along the side surfaces 16A, 16B of the headrest 16, and also has a main line 28BM that connects between rear ends of the inner side line 28BI and the outer side line 28BO.

A front end of the inner side line 28BI is connected to the outer end of the first tear line 28A in the vehicle width direction. A front end of the outer side line 28BO reaches near a front end of the headrest 16. In this embodiment, the front end of the outer side line 28BO is positioned forward with respect to the front end of the inner side line 28BI. The main line 28BM extends in the seat width direction along a back surface (rear surface) of the headrest 16 in the plan view, and a position thereof in the front-rear direction is set near a rear end of the popup duct 18 in the inflated and deployed state. Accordingly, it is possible to smoothly deploy the back tension cloth 26 whose lower end side (lower end side during the deployment) of the outer end portion 26A is connected to the seat back frame 14A.

The tearing of the tear line 28 for deployment of the tension cloth 22 will be described later with an action of this embodiment.

(Configuration of a Control Device)

As shown in FIG. 2, the inflator 20 is electrically connected to a side collision ECU 30 that is a control device for constituting the passenger restraining system 11. In addition, a side collision sensor 32 for detecting a side collision is electrically connected to the side collision ECU 30. The side collision ECU 30 is adapted to operate the inflator 20 when detecting the side collision or unavoidableness of the side collision based on a signal from the side collision sensor 32.

Next, an action of the first embodiment will be described.

In the vehicle seat 10 that is configured as above, the side collision ECU 30 that detects the side collision based on the signal from the side collision sensor 32 activates the inflator 20. Then, as shown in FIG. 3B and FIG. 4B, with the gas supply from the inflator 20, the popup duct 18 is projected onto the seat back 14 while tearing the first tear line 28A, and is deployed on the seat back 14.

Figure 4C:
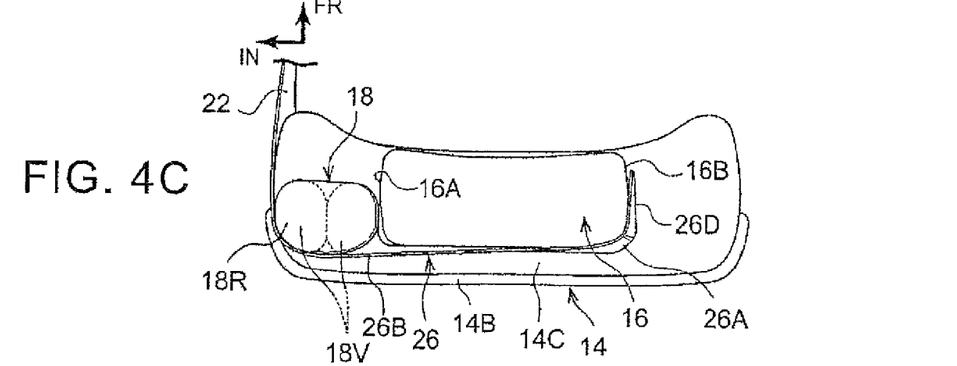
FIG. 4C is a plan view after the completion of the deployment.

In conjunction with the above deployment, the tension cloth 22 is pulled out of the seat cushion 12 and the seat back 14 through the cut line 24, and the deployment thereof is completed as shown in FIG. 3C and FIG. 4C. In addition, the back tension cloth 26 is projected onto the seat back 14 while tearing the second tear line 28B as shown in FIG. 3B and FIG. 4B, and is deployed on the seat back 14 as shown in FIG. 3C and FIG. 4C.

The thus-deployed tension cloth 22 restricts the movement of the seated passenger to the next seat side that could be caused by inertia or a backlash. In other words, the seated passenger is restrained by the tension cloth 22.

At this time, in the vehicle seat 10, the upper end 22B of the tension cloth 22 is connected to the popup duct 18 that has been projected on the seat back 14. Thus, the tension line TL of the tension cloth 22 in the deployed state is positioned forward with respect to that of the lateral deployment member according to a comparative example in which an upper end of the tension cloth is connected to the upper end portion of the seat back 14, for example. More specifically, an imaginary dashed line TLc of FIG. 1 is a tension line of the lateral deployment member according to the above comparative example. Meanwhile, in the vehicle seat 10, the tension line TL of the tension cloth 22 in the deployed state is positioned forward with respect to the tension line TLc of the comparative example. Accordingly, the tension line TL is positioned forward with respect to a center of a shoulder that is a high rigid portion of the seated passenger, and thus is possible to effectively restrain the seated passenger at his/her shoulder.

The restraint load of the seated passenger that acts on the tension cloth 22 during the restraint of the passenger is partially supported by the back tension cloth 26. In other words, a part of this restraint load (a part that acts above the portion supported by the seat back frame 14A) acts as the tension on and is supported by the back tension cloth 26 whose upper edge 26C is the tension line TLb.

Accordingly, it is possible to secure supporting rigidity for restraint of the passenger in the configuration in which the popup duct 18 is inflated and deployed (projected) to deploy the tension cloth 22, that is, the configuration in which the tension line TL is positioned forward with respect to the above comparative example. In other words, in a configuration without the back tension cloth 26, the popup duct 18 that is deployed by gas pressure is likely to collapse to the inside in the vehicle width direction when the passenger is restrained. On the other hand, in the vehicle seat 10 that includes the back tension cloth 26, the back tension cloth 26 supports a part of the restraint load acting on the tension cloth 22. Therefore, it is possible to secure the supporting rigidity for the restraint of the passenger as described above.

In other words, in this embodiment, a function to deploy the tension cloth 22 and a function to support a part of the passenger restraint load on the deployed tension cloth 22 are respectively assigned to the popup duct 18 and the back tension cloth 26. Therefore, there is less restriction for each of the components demonstrate a function thereof, and thus the passenger restraining performance can be realized in a simple structure.

The back tension cloth 26 is connected at the outer end portion 26A in the vehicle width direction to the seat back frame 14A and has the hooked portion 26D that extends forward from the outer end portion 26A and extends around on the outside of the headrest 16 in the vehicle width direction. Accordingly, in the back tension cloth 26, in conjunction with the inflation and deployment of the popup duct 18, a portion between the outer end portion 26A and the inner end portion 26B is deployed while tearing the main line 28BM, and the hooked portion 26D is deployed while tearing the outer side line 28BO. Then, the tension of the back tension cloth 26 for supporting a part of the restraint load acting on the tension cloth 22 is supported by the seat back frame 14A to which the outer end portion 26A is connected, and is also supported by the headrest 16 to which the hooked portion 26D is hooked. Therefore, the back tension cloth 26 can efficiently support a part of the restraint load acting on the tension cloth 22 by the tension that acts on the back tension cloth 26 in a wide range in the upper and down direction (by distributing the tension in a wide range in the upper and down direction).

Furthermore, the tear line 28 is formed in the upper surface 14C of the seat back 14 in the vehicle seat 10. Accordingly, compared to a configuration without a tear line, the popup duct 18 and the back tension cloth 26 are smoothly deployed in a short time. Therefore, the tension cloth 22 that is connected to the upper end portion of the popup duct 18 is deployed on the side of the passenger before the restraint load of the seated passenger acts thereon, and thus is contributed to demonstrate the favorable passenger restraining performance as described above.

Moreover, because the gas is supplied from below to the one vertical duct 18V in the popup duct 18, the popup duct 18 tends to be deployed upright. Particularly, because the vertical duct 18V on a gas supply side is arranged such that it is inflated and deployed while being guided by the side surface 16A of the headrest 16, the popup duet 18 can stably be deployed.

(Modified Example of the Tear Line)

Figure 5:
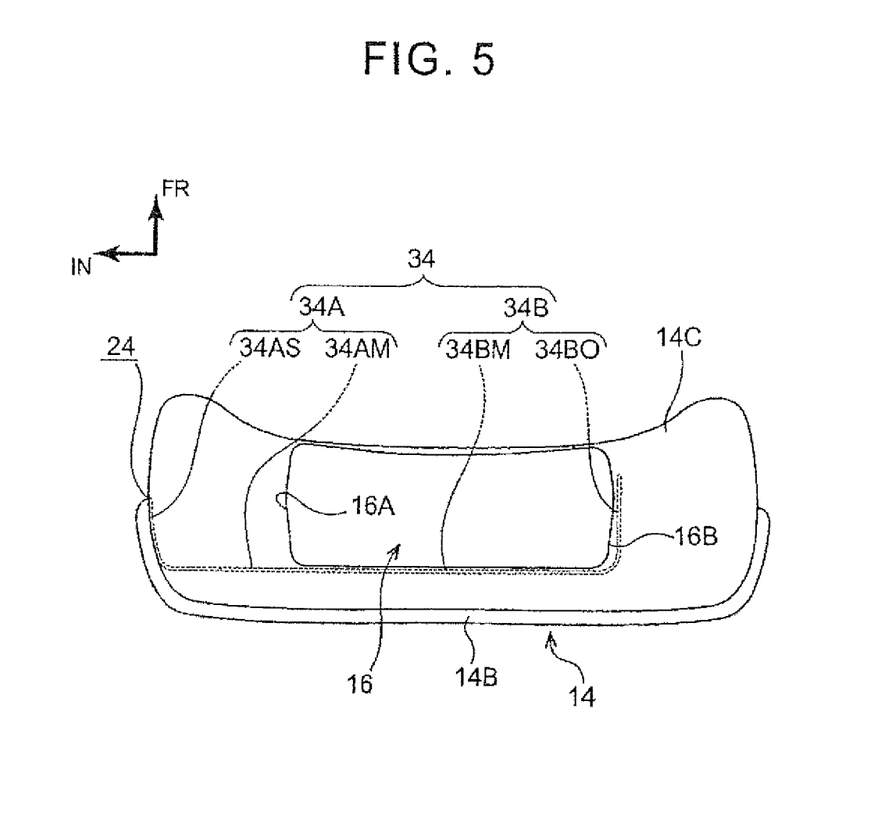
FIG. 5 is a plan view for showing a modified example of a tear line in the first embodiment that corresponds to FIG. 4A.

FIG. 5 is a plan view of a tear line 34 according to a modified example. As shown in this drawing, the tear line 34 includes a first tear line 34A for mainly projecting the popup duct 18 and a second tear liner 34B for mainly projecting the back tension cloth 26.

The second tear line 34B has an outer side line 34BO that extends in the front-rear direction along the side surface 16B of the headrest 16 and a main line 34BM that extends from a rear end of the outer side line 34BO to the inside in the vehicle width direction. The outer side line 34BO and the main line 34BM are respectively formed the same as the outer side line 28BO and the main line 28BM in the second tear line 28B of the tear line 28 in the first embodiment. In other words, the tear line 34 is configured not to have a portion corresponding to the inner side line 28BI.

The first tear line 34A has a main line 34AM that extends as a straight line from an end of the main line 34BM on the inside in the vehicle width direction to the inside in the vehicle width direction and a side line 34AS that connects between the main line 34AM and the cut line 24 in the plan view. More specifically, the main line 34AM is disposed rearward with respect to the first tear line 28A of the tear line 28 in the first embodiment.

In the vehicle seat 10 that includes the tear line 34 according to the modified example, it is possible to basically obtain the same effect as the effect in the first embodiment by the same action as the action in the first embodiment, except for an effect of a guiding property for the popup duct 18 by the side surface 16A of the headrest 16.

(Modified Example of the Tension Cloth)

Figure 6:
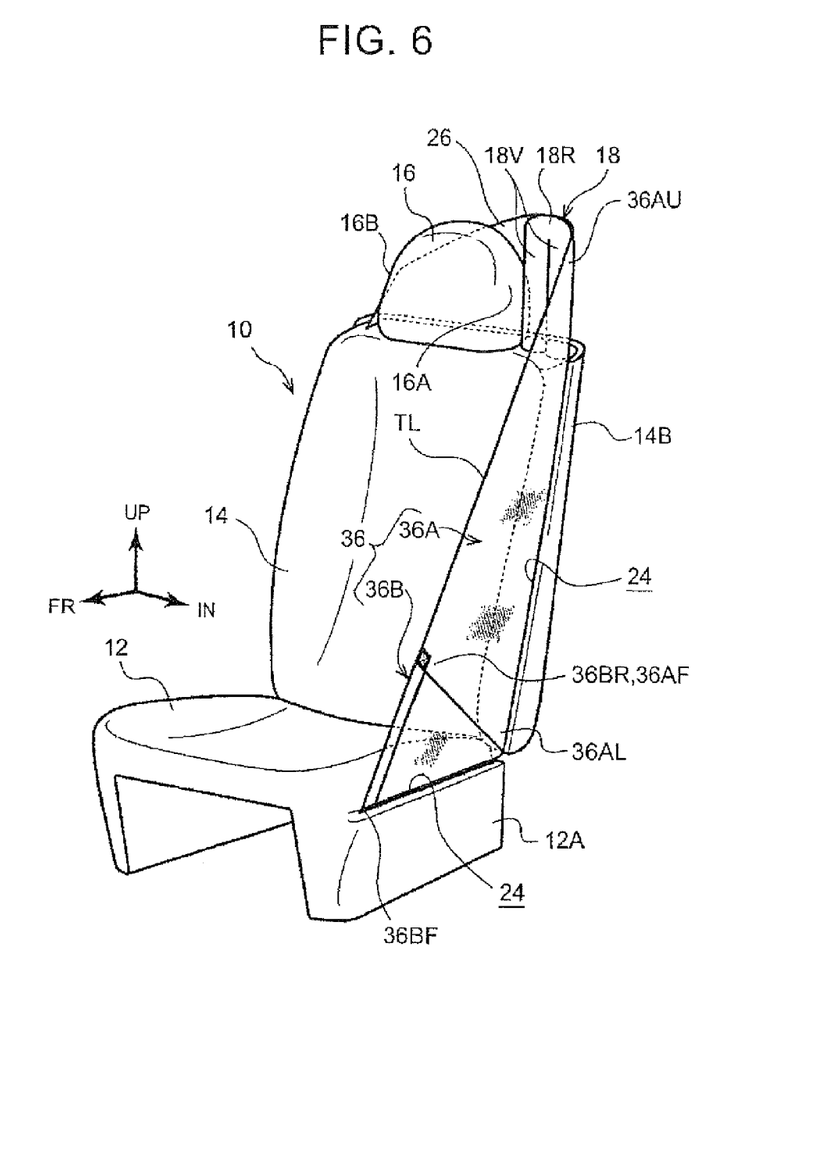
FIG. 6 is a perspective view for showing a modified example of the tension cloth in the first embodiment that corresponds to FIG. 1.

FIG. 6 is a perspective view of the vehicle seat 10 that includes a tension cloth 36 according to the modified example. As shown in this drawing, the tension cloth 36 includes, as main components, a tension cloth main body 36A and a strap 36B. The tension cloth main body 36A has an obtuse triangular shape in the side view in which a front vertex 36AF is positioned between upper and lower vertices 36AU, 36AL in the upper and down direction, and is accommodated only in the side portion of the seat back 14 although not shown. In the tension cloth main body 36A, the upper vertex 36AU is connected to the upper end of the popup duct 18, and a rear edge portion that includes the lower vertex 36AL (except an upper portion that allows the deployment of the popup duct 18) is connected to the seat back frame 14A.

Meanwhile, the front vertex 36AF of the tension cloth main body 36A is connected to a rear end 36BR of the strap 36B, and a front end 36BF of the strap 36B is connected to the front end side of the seat cushion 12. The strap 36B is mainly accommodated in the side portion of the seat cushion 12, and, in this state, the rear end 36BR is connected to the front vertex 36AF of the tension cloth main body 36A in a position near the lower end portion of the seat back 14.

The above-described tension cloth 36 in a deployed state has a straight line as the tension line TL that is formed by connecting between the upper vertex 36AU of the tension cloth main body 36A and the front vertex 36AF corresponding to the rear end 36BR of the strap 36B, and also between the rear end 36BR and the front end 36BF of the strap 36B.

In the vehicle seat 10 that includes the tension cloth 36 according to the modified example, it is possible to basically obtain the same effect as the effect in the above embodiment by the same action as the action in the above embodiment. Unlike the tension cloth 22, a folded portion of the tension cloth 36 is not exposed between the seat back 14 and the seat cushion 12. In other words, only the strap 36B runs between the seat back 14 and the seat cushion 12. Therefore, the adoption of this tension cloth 36 contributes to improvement of appearance as well as to simplified appearance between the seat back 14 and the seat cushion 12. In addition, in this modified example, the strap 36B may be connected to the popup duct 18 and the front vertex 36AF of the tension cloth main body 36A. Furthermore, the upper vertex 36AU and the front vertex 36AF of the tension cloth main body 36A may be connected to the strap 36B that connects between the popup duct 18 and the seat cushion 12.

[Second Embodiment]

A vehicle seat 40 according to a second embodiment of the present invention will be described with reference to FIG. 7. The configurations that are basically similar to those of the first embodiment are designated by the same reference numerals as those used in the configurations of the first embodiment, and their descriptions or illustrations may not be repeated.

Figure 7:
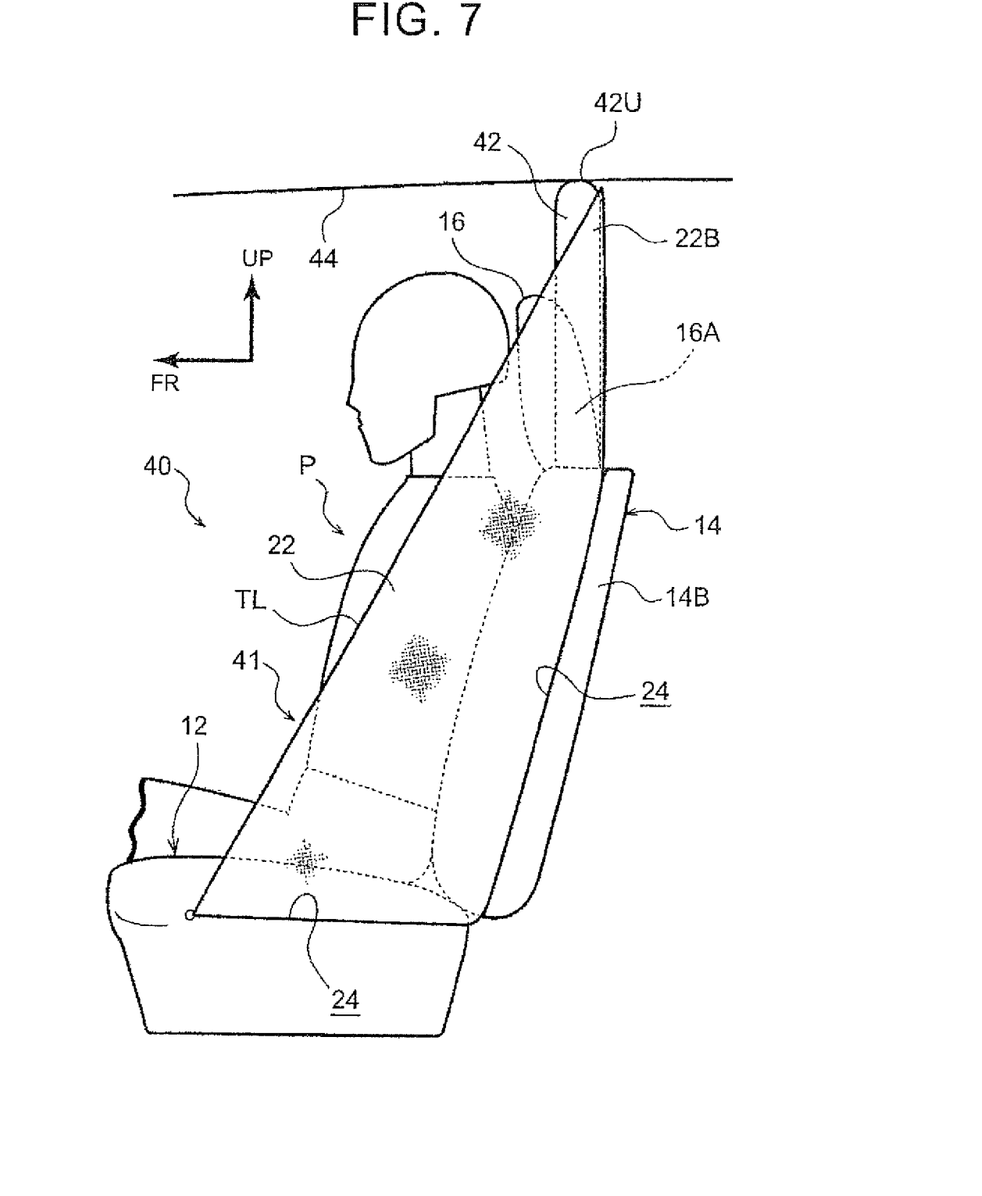
FIG. 7 is a side view for showing an operational state of a passenger restraining system in a vehicle seat according to a second embodiment of the present invention.

FIG. 7 is a side view for schematically showing a deployed (operational) state of a passenger restraining system 41 that constitutes the vehicle seat 40 on which a passenger P is seated. As shown in this drawing, the vehicle seat 40 includes a popup duct 42 instead of the popup duct 18 in the first embodiment that is deployed to the same height as the headrest 16. The popup duct 42 is configured such that, in a deployed state, an upper end 42U thereof is abutted against a roof 44 of an vehicle body in which the vehicle seat 40 is mounted. Although not shown, the popup duct 42 has a substantially inverted U shape in which upper ends of paired vertical duets are coupled to each other by a folding duct, and is configured the same as the popup duct 18 except for a upper and down dimension. In addition, the tension cloth 22 and the back tension cloth 26 are connected to the vicinity of an upper end portion of the popup duct 42. The other configurations of the vehicle seat 40 are the same as those corresponding to the vehicle seat 10 of the first embodiment, including portions not shown.

Accordingly, it is also possible with the vehicle seat 40 according to the second embodiment to basically achieve the same effect by the same action as the vehicle seat 10 according to the first embodiment. In addition, because the popup duct 42 in the vehicle seat 40 is abutted against the roof 44 after the deployment thereof is completed, the popup duct 42 is restricted from being collapsed by friction with the roof 44.

Therefore, it is possible to support a part of the passenger restraint load acting on the tension cloth 22 by the friction between the popup duct 42 and the roof 44.

The upper end of the popup duct 42 to which the upper end portion of the tension cloth 22 is connected is positioned above the upper end of the headrest 16 and reaches the roof 44. Accordingly, the tension line TL of the tension cloth 22 in the vehicle seat 40 is positioned forward with respect to the tension line in the first embodiment. Therefore, the adoption of the popup duct 42 contributes to the improvement in the passenger restraining performance of the tension cloth 22.

[Third Embodiment]

A vehicle seat 50 according to a third embodiment of the present invention will be described with reference to FIG. 8 and FIG. 9. The configurations that are basically similar to those of the first embodiment are designated by the same reference numerals as those used in the configurations of the first embodiment, and their descriptions or illustrations may not repeated.

Figure 8:
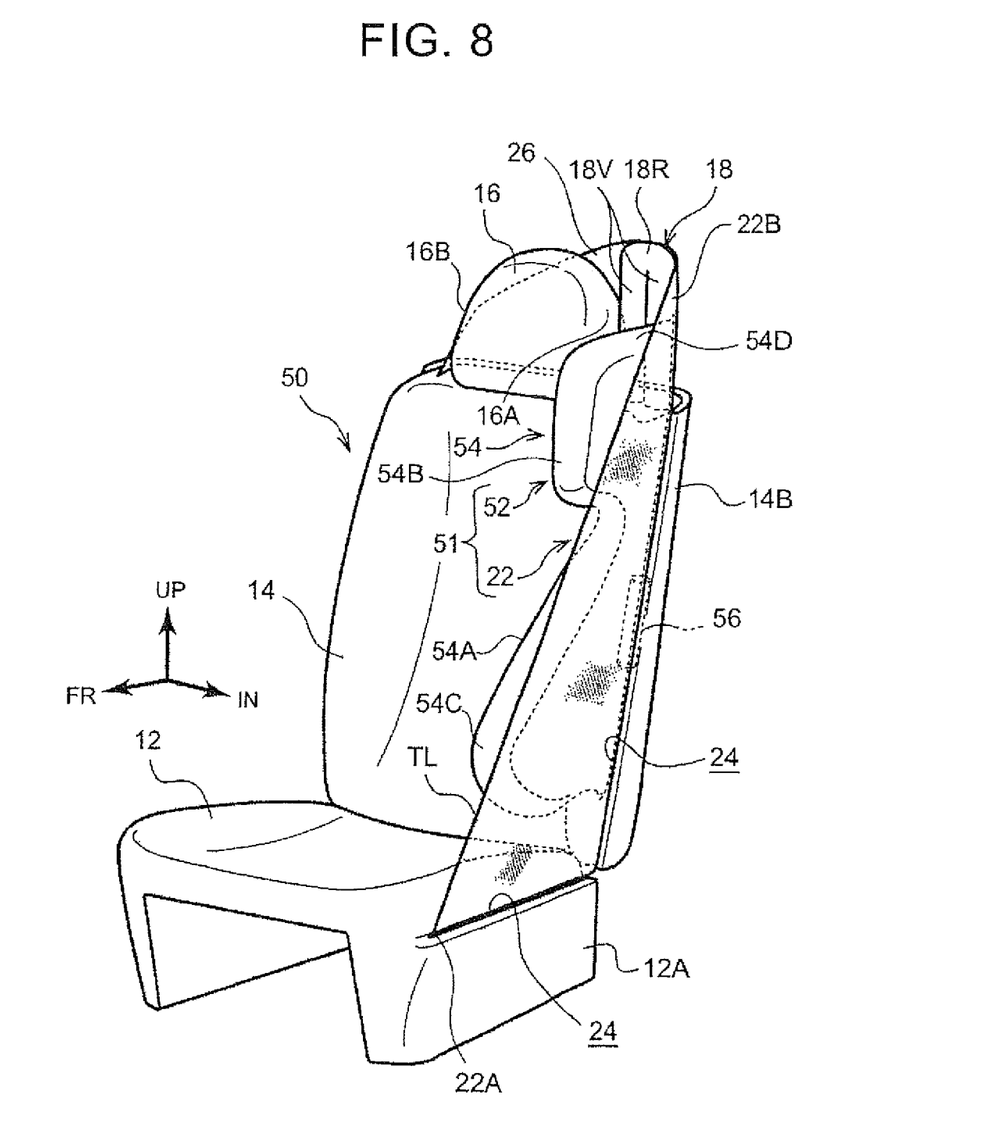
FIG. 8 is a perspective view for showing an operational state of a passenger restraining system in a vehicle seat according to a third embodiment of the present invention.
Figure 9:
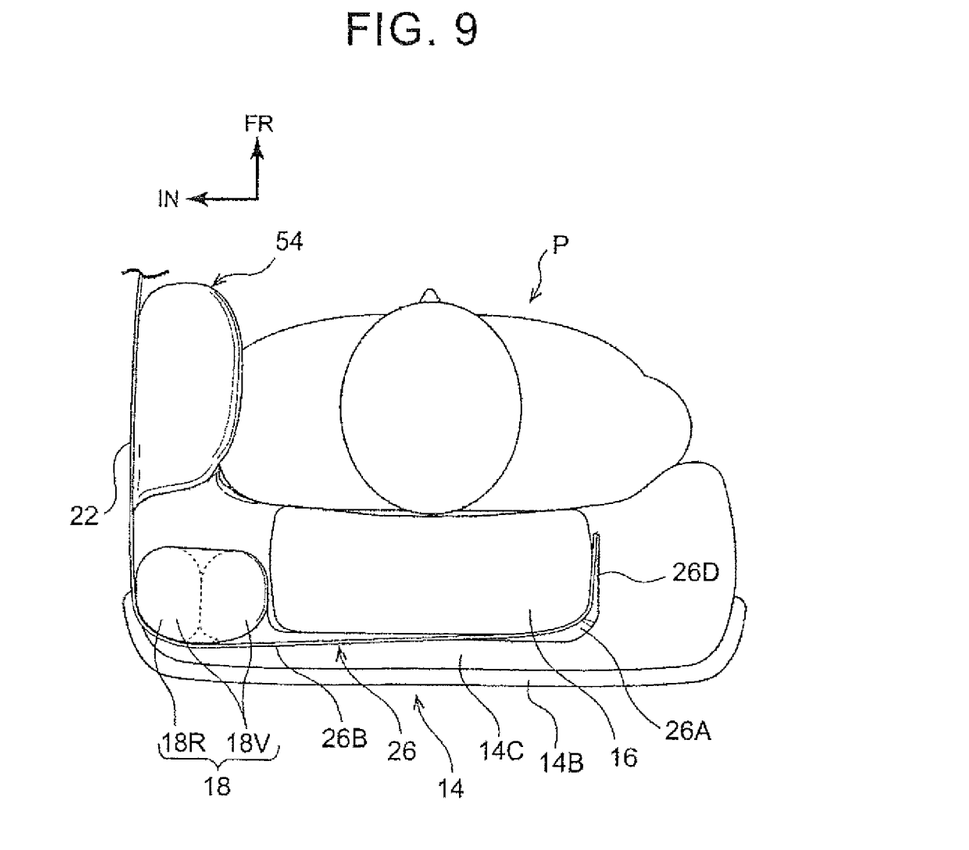
FIG. 9 is a plan view for showing a process in a middle of deployment of a side airbag in the vehicle seat according to the third embodiment that corresponds to FIG. 4C.

FIG. 8 is a perspective view that shows a deployed (an operational) state of a passenger restraining system 51 for constituting the vehicle seat 50 according to the third embodiment of the present invention and that corresponds to FIG. 1. As shown in this drawing, the passenger restraining system 51 differs from the passenger restraining system in the vehicle seat 10 according to the first embodiment in a point that the passenger restraining system 51 includes a side airbag device 52 in addition to the tension cloth 22. The side airbag device 52 is configured as a so-called far-side airbag device that is provided in the side portion of the vehicle seat 50 on the inside in the vehicle width direction.

The side airbag device 52 includes, as main components, a side airbag 54 that is inflated and deployed on the inside in the vehicle width direction with respect to the seated passenger and an inflator 56 that supplies the gas to the side airbag 54. Each component of the side airbag device 52 including the side airbag 54 and the inflator 56 is modularized and is supported by the seat back frame in the seat back 14. The side airbag 54 is projected out of the seat back 14 from the cut line 24 and is inflated and deployed on the inside of the tension cloth 22, that is, on the seated passenger side.

The side airbag 54 includes a central chamber 54A for restraining a chest and the shoulder of the seated passenger, a head-protection chamber 54B for restraining a head of the seated passenger, and an abdomen-protection chamber 54C for restraining an abdomen of the seated passenger. A recess that is formed between the central chamber 54A and the head-protection chamber 54B serves as a clearance for an arm of the seated passenger. A connected portion 54D of the head-protection chamber 54B that becomes a posterosuperior corner portion in the inflated and deployed state is connected together with the upper end 22B of the tension cloth 22 to the popup duct 18.

In other words, an upper end side of the side airbag 54 moves upward in conjunction with the deployment of the popup duct 18. In order to allow this movement, the side airbag 54 is folded in accordion fashion or the like in the front-rear direction, and a middle portion of the thus folded side airbag 54 is further folded in accordion fashion or the like in the upper and down direction (not shown). Thus, the side airbag 54 is unfolded in the upper and down direction to be allowed for the deployment above the popup duct 18.

(Configuration of the Control Device)

Although not shown, the passenger restraining system 51 of the vehicle seat 50 includes the side collision ECU that functions as the control device for controlling the operations of the inflator 20 for the popup duct 18 and the inflator 56 for the side airbag 54. The side collision ECU is electrically connected to a pre-crash sensor that predicts a side collision and the side collision sensor 32 as well as to the inflators 20, 56.

The side collision ECU activates the inflator 20 when predicting a side collision based on a signal from the pre-crash sensor, and activates the inflator 56 when detecting a side collision based on the signal from the side collision sensor 32. Accordingly, the side collision ECU, for example, activates the inflator 20 approximately 300 msec. before a side collision occurs, waits for the popup duct 18 to be completely deployed, and activates the inflator 56 for the side airbag 54 in 1 to 10 msec. after detecting a side collision. Alternatively, the pre-crash sensor may not be provided, and the inflators 20, 56 may be activated in this order with a specified time interval therebetween after the side collision sensor 32 detects a side collision. Further alternatively, the pre-crash sensor may not be provided, and an activation signal may be output simultaneously to the inflators 20, 56 after the side collision sensor 32 detects a side collision. Even in this case, the popup duct 18 may be set to complete the deployment before the side airbag 54 on the basis of a volume difference between the popup duct 18 and the side airbag 54.

The other configurations of the vehicle seat 50 are the same as those corresponding to the vehicle seat 10, including portions not shown.

Next, an action of the third embodiment will be described.

In the vehicle seat 50 that is configured as above, the side collision ECU that has predicted a side collision based on the signal from the pre-crash sensor activates the inflator 20. Thereafter, the popup duct 18 is deployed above the seat back 14 by the gas pressure from the inflator 20. In conjunction with this deployment, the tension cloth 22 is pulled out of the seat cushion 12 and the seat back 14 through the cut line 24 and is deployed as shown in FIG. 8 and FIG. 9. In addition, at least a part of the side airbag 54 that is connected at the connected portion 54D to the popup duct 18 is pulled out of the seat back 14 through the cut line 24. FIG. 9 is a plan view for showing a process of the deployment of the side airbag 54 on the side of a seated passenger P.

Furthermore, the side collision ECU that has detected a side collision based on the signal from the side collision sensor 32 activates the inflator 56. Thereafter, the side airbag 54 is inflated and deployed to the front along the tension cloth 22 that has already been deployed in a position between the tension cloth 22 and the seated passenger. The seated passenger is restrained by the tension cloth 22 and the side airbag 54 and is thereby restricted from moving to the next seat side.

Here, in the vehicle seat 50, the effects of the deployment of the tension cloth 22 by the popup duct 18 and the supporting of the restraint load by the back tension cloth 26 are the same as those of the first embodiment.

As described above, because the side airbag 54 is inflated and deployed along the tension cloth 22 that has been deployed, the movement thereof to separate from the seated passenger in the seat width direction is restricted, and thus a deployment direction thereof is stabilized. In other words, the inflation and deployment is appropriately completed shortly after a side collision is detected (the inflation and deployment is started). Furthermore, because the central chamber 54A restrains the shoulder that is the high rigid portion of the seated passenger, it is possible to effectively restrict the head of the seated passenger from moving in the vehicle width direction. Particularly, because the center of the shoulder of the seated passenger is covered by the tension cloth 22 in the deployed state as described above (the tension line TL is positioned forward with respect to the center of the shoulder), the reaction force that is associated with the support for the shoulder by the central chamber 54A is favorably supported by the tension cloth 22.

The side airbag 54 is also provided with the head-protection chamber 54B. Thus, it is possible to further effectively and directly restrict the movement of the head in the vehicle width direction. The side airbag 54 has the central chamber 54A, the head-protection chamber 54B, and the abdomen-protection chamber 54C. Therefore, the seated passenger is restrained from the head to the abdomen on the inside in the vehicle direction (on the next seat side), and thus it is possible to effectively protect the passenger against a side collision.

In the above-described embodiments, the vehicle seats 10, 40, and 50 each include the popup duct 18, the tension cloth 22, (and the side airbag device 52) on the inside in the vehicle width direction (on the next seat side). However, the present invention is not limited thereto. For example, the popup duct 18, the tension cloth 22, (and the side airbag device 52) may be provided on both sides in the vehicle width direction or may be provided only on the outside in the vehicle width direction (on the side door side).

In addition, in the third embodiment described above, the vehicle seat 50 includes the popup duct 18. However, the present invention is not limited thereto. For example, the vehicle seat 50 may include the popup duct 42 of the second embodiment instead of the popup duct 18.

Furthermore, in each of the above-described embodiments, the back tension cloth 26 has the hooked portion 26D. However, the present invention is not limited thereto. For example, the back tension cloth 26 may not have the hooked portion 26D (the tension is only supported by the seat back frame 14A).

Moreover, either one of the popup ducts 18, 42 that have the inverted U shape in the front view is included in the above-described embodiments. However, the present invention is not limited thereto. For example, the popup duct that is a single columnar duct may be included, or the popup duct that has the inverted U shape in the side view may be included.

In each of the above-described embodiments, the back tension cloth 26 is integrally formed with the tension cloth 22. However, the present invention is not limited thereto. For example, the back tension cloth 26 and the tension cloth 22 may independently be connected to the popup duct 18.

In each of the above-described embodiments, the tension cloth 22 has the triangular shape in the side view. However, the present invention is not limited thereto. For example, the tension cloth that has a bulging portion that bulges forward with respect to the tension line TL may be included. The bulging portion may be connected to a front portion of the head-protection chamber 54B of the side airbag 54 in the third embodiment, for example.

It will be understood that the present invention can be practiced with various modifications made thereto without departing from the scope of the present invention.

What is claimed is:

1. A vehicle seat, comprising:
   a projected member that is accommodated in a seat back, and that is projected and deployed above the seat back when inflated by a gas supply;
   a lateral deployment member whose upper end side is connected to the projected member, whose lower end side is connected to a front end side of a seat cushion, and that is accommodated in a lateral side of the seat cushion and a lateral side of the seat back, the lateral deployment member being deployed by tension that acts between a portion connected to the projected member and a portion connected to the seat cushion in conjunction with deployment of the projected member; and
   a tension support member whose one end side is supported by the seat back in a portion separated from the lateral deployment member in a seat width direction and whose other end side is connected to an upper end side of the lateral deployment member or the projected member, the tension support member being subject to the tension in the seat width direction at least when a seated passenger is restrained by the lateral deployment member.

2. The vehicle seat according to claim 1, wherein the projected member is disposed for deployment along a side portion of a headrest provided on the seat back that is on an accommodated side of the lateral deployment member, and the one end side of the tension support member extends around on another side portion of the headrest that is opposite from the side portion on a disposed side of the projected member.

3. The vehicle seat according to claim 2, further comprising:
   a first tear line that is formed along the scat width direction in an upper surface of the seat back on the disposed side of the projected member with respect to the headrest and that is formed for projecting the projected member; and
   a second tear line that passes behind the headrest and is connected to the first tear line, whose one end portion on an opposite side from the first tear line extends along the other side portion of the headrest in a front-rear direction of the seat in a plan view in which the vehicle seat is seen from above, and that is formed, in an upper surface of the seat back, for projecting the tension support member.

4. The vehicle seat according to claim 1, wherein the projected member has a folded shape in which paired struts aligned in parallel are coupled to each other at upper ends, and is projected and deployed above the seat back when the gas is supplied to one of the struts.

5. The vehicle seat according to claim 4, wherein the projected member has an inverted U shape in which the paired struts aligned in parallel are coupled to each other at the upper ends by a folding duct, outer portions of the paired struts are connected to each other at side portions thereof, and inner portions of the paired struts are separated from each other.

6. The vehicle seat according to claim 4, wherein the paired struts aligned in parallel in the seat width direction, the gas is supplied to one of the paired struts on a headrest side.

7. The vehicle seat according to claim 1, wherein the projected member is configured to be deployed at a same height as or above a headrest during the projection and deployment thereof.

8. The vehicle seat according to claim 7, wherein the projected member is configured to be deployed such that an upper end of the projected member is abutted against a roof of a vehicle body in which the vehicle seat is mounted.

9. The vehicle seat according to claim 1, wherein the lateral deployment member is formed from a tension cloth main body and a strap, the tension cloth main body has an obtuse triangular shape whose upper vertex is connected to the projected member while a lower vertex is connected to a lower end of the seat back and whose other vertex is connected to an end of the strap, and another end of the strap is connected to a front end of a side portion of the seat cushion.

10. The vehicle seat according to claim 1, further comprising a side airbag that is accommodated in the seat back and that is inflated and deployed between the lateral deployment member and the seated passenger when a side collision of a vehicle is detected or predicted.

11. The vehicle seat according to claim 10, wherein the projected member is controlled to complete deployment before deployment of the side airbag order when a side collision of the vehicle is detected or predicted.

12. The vehicle seat according to claim 11, wherein the side airbag includes a central chamber that is configured to restrain a chest and a shoulder of the seated passenger, a head-protection chamber that is configured to restrain a head of the seated passenger, and an abdomen-protection chamber that is configured to restrain an abdomen of the seated passenger.

13. The vehicle seat according to claim 10, wherein the side airbag includes a central chamber that is configured to restrain a chest and a shoulder of the seated passenger, a head-protection chamber that is configured to restrain a head of the seated passenger, and an abdomen-protection chamber that is configured to restrain an abdomen of the seated passenger.

* * * * *